United States Patent
Shen et al.

(10) Patent No.: US 9,843,403 B2
(45) Date of Patent: Dec. 12, 2017

(54) RADIO RELAY STATION

(71) Applicant: NTT DOCOMO, INC., Tokyo (JP)

(72) Inventors: Jiyun Shen, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/508,417

(22) PCT Filed: Sep. 2, 2015

(86) PCT No.: PCT/JP2015/074976
§ 371 (c)(1),
(2) Date: Mar. 2, 2017

(87) PCT Pub. No.: WO2016/035827
PCT Pub. Date: Mar. 10, 2016

(65) Prior Publication Data
US 2017/0288793 A1   Oct. 5, 2017

(30) Foreign Application Priority Data
Sep. 3, 2014   (JP) .................................. 2014-179445

(51) Int. Cl.
*H04B 7/15*        (2006.01)
*H04B 7/185*       (2006.01)
(Continued)

(52) U.S. Cl.
CPC ........... *H04B 17/309* (2015.01); *H04B 7/155* (2013.01); *H04W 88/08* (2013.01)

(58) Field of Classification Search
CPC .. H04B 17/309; H04B 17/318; H04B 17/338; H04B 16/338
See application file for complete search history.

(56) References Cited

U.S. PATENT DOCUMENTS

2004/0203911 A1* 10/2004 Masuda ............... H04B 7/2606
                                                 455/456.1
2007/0249347 A1* 10/2007 Saifullah ............... H04W 36/38
                                                 455/436
(Continued)

OTHER PUBLICATIONS

Yasuda, Hiroto et al.; "Realization Method of Moving Cell for 5G Future Radio Access Network."; IEICE Technical Report, vol. 114, No. 8, RCS2014-3, pp. 13-18, Apr. 2014, The Institute of Electronics, Information and Communication Engineers (10 pages).

(Continued)

*Primary Examiner* — Tilahun B Gesesse
(74) *Attorney, Agent, or Firm* — Osha Liang LLP

(57) ABSTRACT

A radio relay station is arranged on a moving conveyance. The radio relay station receives downlink radio signals from a stationary base station fixed outside the conveyance, and transmits to destination user equipments in the conveyance downlink radio signals resulting from the downlink radio signals transmitted from the stationary base station. In addition, the radio relay station receives uplink radio signals from multiple user equipments in the conveyance, and transmits to the stationary base station uplink radio signals resulting from the uplink radio signals transmitted from the multiple user equipments. The radio relay station receives from the multiple user equipments auxiliary radio signals indicating a downlink radio signal which the stationary base station has transmitted, detects, within a result of reception of the auxiliary radio signals, a downlink radio signal addressed to a user equipment in the conveyance, and transmits the downlink radio signal to the user equipment.

10 Claims, 8 Drawing Sheets

(51) Int. Cl.
 H04B 17/02    (2006.01)
 H04B 17/309   (2015.01)
 H04B 7/155    (2006.01)
 H04W 88/08    (2009.01)

(56) References Cited

U.S. PATENT DOCUMENTS

| | | | | |
|---|---|---|---|---|
| 2008/0070582 A1* | 3/2008 | Cai | ............... | H04B 7/15542 |
| | | | | 455/450 |
| 2008/0200183 A1* | 8/2008 | Voyer | ............... | B66B 1/34 |
| | | | | 455/456.1 |
| 2010/0182916 A1* | 7/2010 | Drewes | ............ | H04B 7/15521 |
| | | | | 370/252 |
| 2011/0158157 A1* | 6/2011 | Ninagawa | ........ | H04B 7/15578 |
| | | | | 370/315 |
| 2011/0228720 A1* | 9/2011 | Ninagawa | ........... | H04B 7/155 |
| | | | | 370/315 |
| 2011/0256825 A1* | 10/2011 | Min | ............... | H04B 7/2606 |
| | | | | 455/7 |
| 2011/0292862 A1* | 12/2011 | Shimizu | ........... | H04B 7/15528 |
| | | | | 370/315 |
| 2016/0233947 A1* | 8/2016 | Shen | ............... | H04W 4/046 |

OTHER PUBLICATIONS

International Search Report issued in PCT/JP2015/074976 dated Nov. 17, 2015 (3 pages).

* cited by examiner

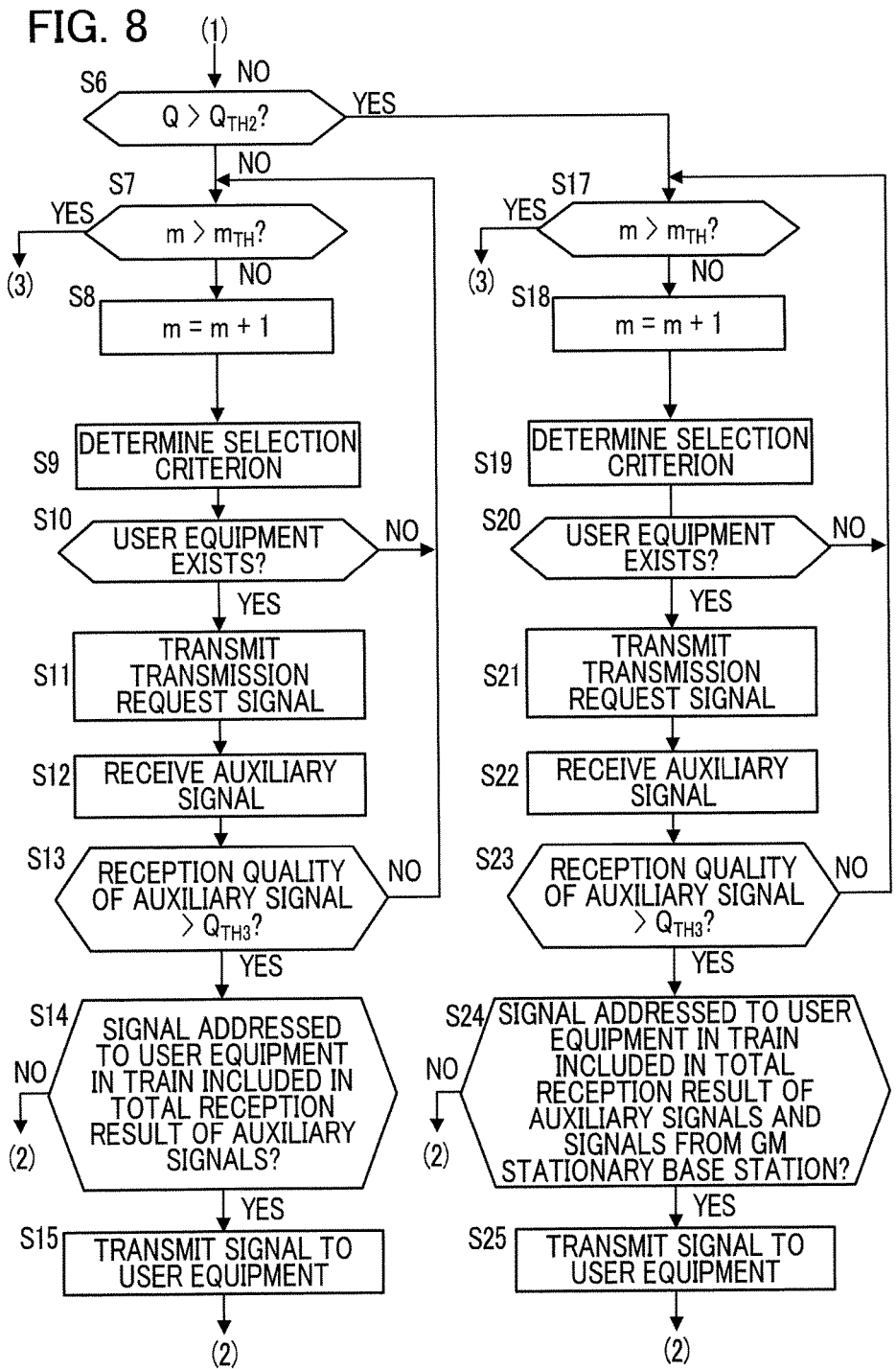

RADIO RELAY STATION

TECHNICAL FIELD

The present invention relates to a radio relay station arranged on a moving conveyance.

BACKGROUND ART

Non-Patent Document 1 discloses the concept of "group mobility". This group mobility is a technology providing mobile communication services to user equipments in a conveyance by an on-board station arranged on the conveyance, in which the on-board station performs wireless communication with the user equipments in the conveyance and radio communication with a stationary base station outside the conveyance. The on-board station is a radio relay station and is also a base station for the user equipments in the conveyance. When the on-board station moves with the conveyance, the cell of the on-board station also moves. Even when the conveyance moves, the propagation condition of the radio waves between the on-board station and the user equipments in the conveyance is always stable.

RELATED ART DOCUMENT

Non-Patent Document

Non-Patent Document 1: Hiroto Yasuda, and five others, "Realization Method of Moving Cell for 5G Future Radio Access Network", IEICE Technical Report, Vol. 114, No. 8, RCS2014-3, pp. 13-18, April, 2014, The Institute of Electronics, Information and Communication Engineers

SUMMARY OF THE INVENTION

Problem to be Solved by the Invention

The stationary base station for group mobility is arranged in the middle of the route of the conveyance. The user equipments in the conveyance can not only communicate with the stationary base station through the on-board station, but can also communicate with another base station. When the conveyance exists outside the range of the cell of the stationary base station for group mobility, each user equipment communicates with another base station when the propagation condition between the user equipment and the other base station is satisfactory. When conveyance exists within the range of the cell of the stationary base station for group mobility, communication between the stationary base station and the on-board station is possible, and therefore, each user equipment communicates with the stationary base station through the on-board station.

However, even if the conveyance is located near the stationary base station for group mobility, when an obstacle (e.g., a building, overhead wire, a wall, an electric pole, or another conveyance) exists between the stationary base station and the conveyance, propagation of radio waves between the stationary base station and the on-board station deteriorates, and therefore, the communication quality between each user equipment and the stationary base station through the on-board station is degraded. In some cases, communication with the user equipments in the conveyance stops.

In view of above, the present invention provides a radio relay station which can improve the quality of communication with user equipments in a conveyance even when the propagation conditions for radio waves between a stationary base station and the radio relay station arranged on the conveyance are not satisfactory.

Means of Solving the Problem

According to the present invention, a radio relay station arranged on a moving conveyance is provided. The radio relay station includes: a first radio receiver configured to receive a downlink radio signal from at least one stationary base station that is fixed outside the conveyance; a second radio receiver configured to receive uplink radio signals from a plurality of user equipments in the conveyance, and to receive, from more than one user equipment being at least a part of the plurality of user equipments, auxiliary radio signals indicating the downlink radio signal which the at least one stationary base station has transmitted; a first radio transmitter configured to transmit, to a destination user equipment in the conveyance, a downlink radio signal resulting from the downlink radio signal transmitted from the at least one stationary base station and received by the first radio receiver; a second radio transmitter configured to transmit to the at least one stationary base station uplink radio signals resulting from the uplink radio signals transmitted from the plurality of user equipments and received by the second radio receiver; and a signal detector configured to detect within a result of reception of the auxiliary signals a downlink radio signal that is addressed to a user equipment in the conveyance. The first radio transmitter transmits the downlink radio signal, which is detected by the signal detector and is addressed to the user equipment in the conveyance, to that user equipment.

Effect of the Invention

In the radio relay station arranged on a conveyance according to the present invention, the second radio receiver receives, from more than one user equipment being at least a part of the plurality of user equipments in the conveyance, the auxiliary radio signals indicating a downlink radio signal which the stationary base station has transmitted. The signal detector makes an attempt to detect a downlink radio signal addressed to a user equipment in the conveyance within a result of reception of the auxiliary signals, and the first radio transmitter transmits to the user equipment the downlink radio signal addressed to the user equipment in the conveyance, wherein the downlink radio signal is detected by the signal detector. Thus, the radio relay station can use the plurality of user equipments as substitutes for multiple downlink receiving antennas of the radio relay station, and can receive downlink radio signals transmitted from the stationary base station. Therefore, the quality of communication for the user equipments in the conveyance can be improved even when the propagation condition between the stationary base station and the radio relay station arranged on the conveyance is poor and the quality of reception, by the first radio transmitter, of the downlink radio signals from the stationary base station is unsatisfactory.

BRIEF DESCRIPTION OF THE DRAWINGS

FIG. 8 is a continuation of the flowchart of FIG. 7.

MODES FOR CARRYING OUT THE INVENTION

Hereinbelow, various embodiments of the present invention are explained with reference to the accompanying drawings.

Group Mobility

Figure 1:
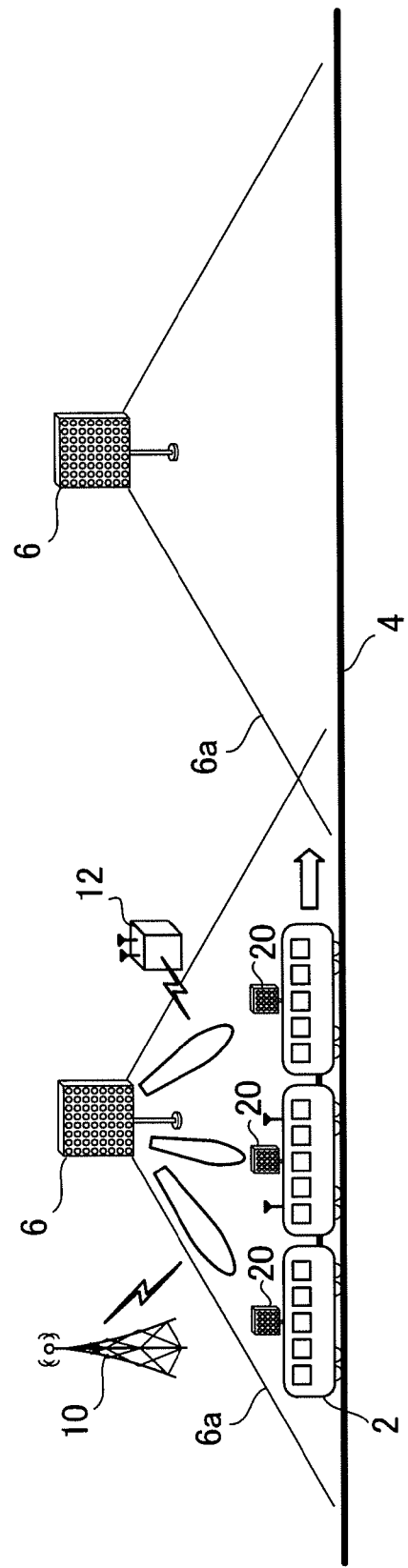
FIG. 1 is a diagram illustrating an outline of group mobility.

The concept of group mobility (GM) is explained in detail below with reference to FIGS. 1 and 2. As illustrated in FIG. 1, railroad cars (specifically, as a train (conveyance) 2) run along a predetermined route, i.e., a track 4. Multiple stationary GM base stations (stationary base stations) 6 are arranged near the track 4. A GM antenna set 20 is arranged on the outside of each car of the train 2. The GM antenna set 20 can perform both of transmission and reception, receives radio waves from the stationary GM base stations 6, and transmits radio waves to the stationary GM base stations 6.

Figure 2:
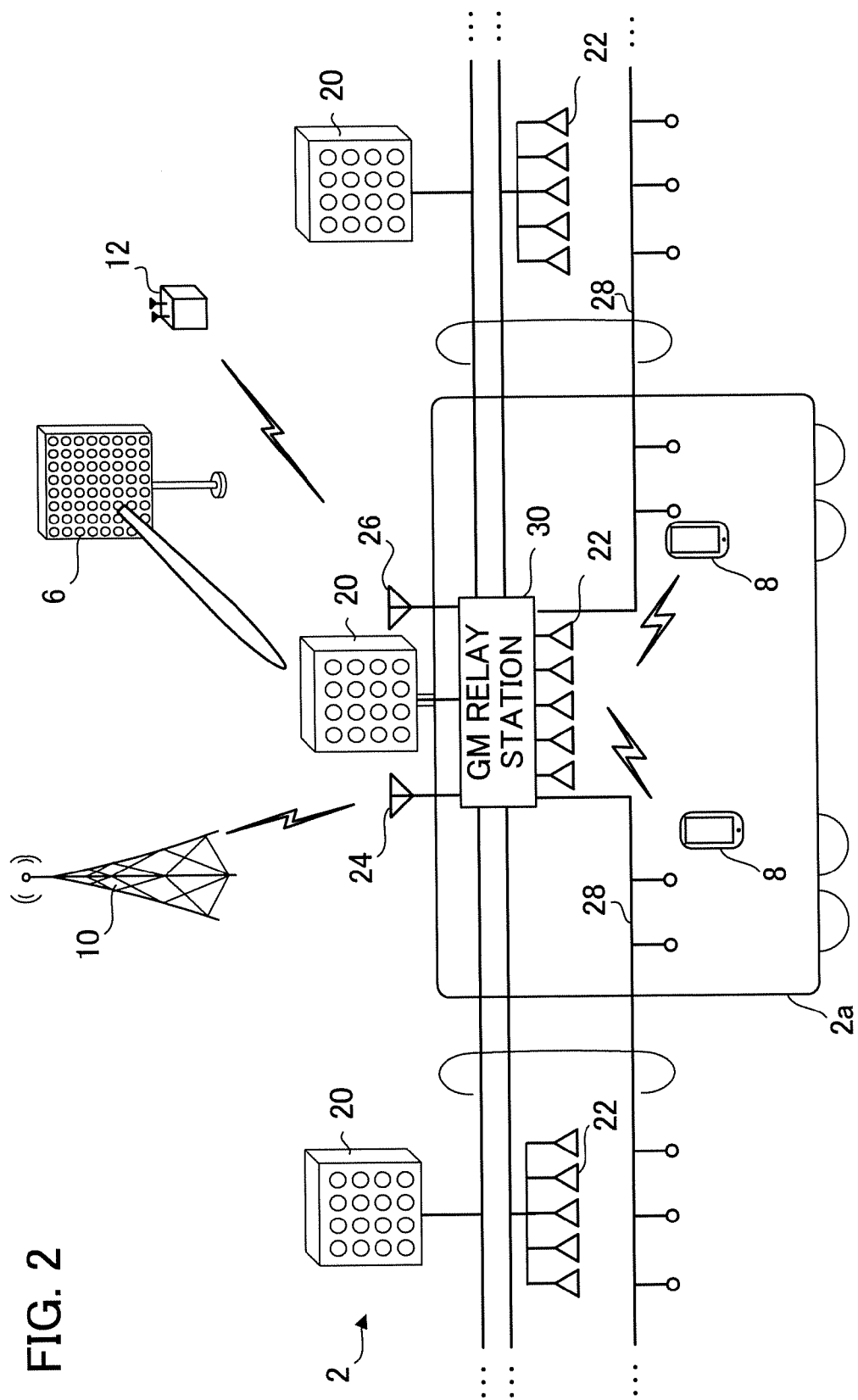
FIG. 2 is a diagram illustrating a system configuration for group mobility.

As illustrated in FIG. 2, the GM antenna set 20 arranged on each of the multiple cars of the train 2 is connected to a GM relay station 30, which is arranged on a car 2a of the multiple cars of the train 2 as illustrated in FIG. 2. In addition, interior antenna sets 22 are arranged on the multiple cars of the train 2 for radio communication with user equipments (UEs, or mobile stations) 8 in each train car. The interior antenna sets 22 are connected to the GM relay station 30. The interior antenna sets 22 can perform both of transmission and reception: receiving radio waves from the user equipments 8, and transmitting radio waves to the user equipments 8.

In addition, in the train car 2a, an antenna set 24 for radio communication with the macro cell base station (stationary base station) 10 and an antenna set 26 for radio communication with the small cell base station (stationary base station) 12 are arranged. The antenna set 24 can perform both of transmission and reception: receiving radio waves from the macro cell base station 10, and transmitting radio waves to the macro cell base station 10. The antenna set 26 can perform both of transmission and reception: receiving radio waves from the small cell base station 12, and transmitting radio waves to the small cell base station 12.

The stationary GM base station 6 is arranged for GM, and can perform both of transmission and reception: transmitting radio waves to the GM antenna sets 20 mounted on the train 2, and receiving radio waves from the GM antenna sets 20. The GM relay station (on-board station, or radio relay station) 30 arranged on the train 2 performs radio communication with the user equipments 8 in the train 2 through the interior antenna sets 22, and performs radio communication with the stationary GM base station 6 outside the train 2 through the GM antenna sets 20, so that the GM relay station 30 can provide a mobile communication service to the user equipment 8 in the train 2. Specifically, the GM antenna sets 20 receive downlink radio signals from the stationary GM base station 6, and the interior antenna sets 22 transmit downlink radio signals resulting from the downlink radio signals transmitted from the stationary GM base station 6, to the user equipments 8 in the train 2. On the other hand, the interior antenna sets 22 receive uplink radio signals from the user equipments 8, and the GM antenna sets 20 transmit to the stationary GM base station 6 uplink radio signals resulting from the uplink radio signals transmitted from the user equipments 8.

In a downlink relay method, the GM relay station 30 may use the DF (decode-and-forward) relay or the AF (amplify-and-forward) relay. In the DF relay, downlink signals received from the stationary GM base station 6 are decoded, and transmitted in a signal form which is used in the downlink in the train cars. In the AF relay, the signal form is not changed.

The transmission method in the train cars can be selected from among various types of methods. For example, radio transmission using radio waves such as WiFi and MIMO, or visible-light communication can be used. In a case in which visible light is used in downlink communication, visible-light sources are used instead of the interior antenna sets 22.

The GM relay station 30 is a base station for the user equipments 8 in the train 2. When the GM relay station 30 and the GM antenna sets 20 move with the train 2, the cells formed by the GM antenna sets 20 also move. Even when the train 2 moves, the propagation condition of radio waves between the GM relay station 30 and the user equipments 8 in the train 2 is stable at all times. In addition, even when the train 2 moves, handover or reselection of the cell for individual user equipments 8 in the train 2 is unnecessary as long as the GM relay station 30 can change the connection from the current stationary GM base station 6 to another stationary GM base station 6. Since the interior antenna sets 22 are arranged inside the cars of the train 2, radio waves suffer no transmission loss due to the walls of the train cars. Therefore, the user equipments 8 in the train 2 can stably communicate with the GM relay station 30.

Further, the GM relay station 30 may be connected to a cable 28 connected to an information processing device (e.g., a personal computer) in the cars of the train 2. In this case, the GM relay station 30 relays communication between the information processing device and the stationary GM base station 6.

Although the cells 6a of the multiple stationary GM base stations 6 overlap as illustrated in FIG. 1, the cells 6a do not need to overlap. In other words, the intervals between the stationary GM base stations 6 may be increased.

The stationary GM base stations 6, the macro cell base station 10, and the small cell base station 12 constitute a part of a network of a communication carrier. The user equipments 8 in the train 2 can not only perform communication with the stationary GM base station 6 through the GM relay station 30, but can also perform communication with the macro cell base station 10 or the small cell base station 12. When the train 2 exists outside of the ranges of the cells 6a of the stationary GM base stations 6, the user equipments 8 communicate with another base station as long as the propagation condition between the user equipments 8 and the other base station is satisfactory. When the train 2 is within the range of the cell 6a of one of the stationary GM base stations 6, communication between the stationary GM base station 6 and the GM relay station 30 is possible, and therefore, the user equipments 8 communicate with the stationary GM base station 6 through the GM relay station 30. The provision of the stationary GM base station 6 reduces the processing burden on the existing communication facilities such as the macro cell base station 10 and the small cell base station 12.

The GM relay station 30 can also communicate with the macro cell base station 10 and the small cell base station 12 through the antenna set 24 and the antenna set 26. For example, when the stationary GM base station 6 fails or when the train 2 is outside the ranges of the cells 6a of the stationary GM base stations 6, the GM relay station 30 can communicate with the macro cell base station 10 or the small cell base station 12 instead of the stationary GM base stations 6.

The macro cell base station 10 uses a low frequency band (e.g., the frequency band at 2 GHz), and the small cell base station 12 uses, for example, a frequency band at 3.5 GHz, and the stationary GM base station 6 uses a high frequency band (e.g., a frequency band at 10 GHz or higher). Since the transmission loss increases with the frequency, the coverage of the stationary GM base stations 6 and that of the small cell base station 12 are small, while the coverage of the macro cell base station 10 is large. Therefore, the GM relay station 30 may connect with the macro cell base station 10 for C plane (control plane) processing of the user equipments 8, and with the stationary GM base station 6 or the small cell base station 12 for U plane (user plane) processing of the user equipments 8. When the GM relay station 30 cannot connect with the stationary GM base station 6 or the small cell base station 12, the GM relay station 30 may connect with the macro cell base station 10 for C plane (control plane) processing of the user equipments 8. The user equipments 8 in the train 2 may also connect with the macro cell base station 10 for C plane (control plane) processing of the user equipments 8, and with the GM relay station 30 for U plane (user plane) processing of the user equipments 8.

In a method for relaying downlink signals transmitted from the macro cell base station 10 or the small cell base station 12, the GM relay station 30 may use the DF relay or the AF relay. In the DF relay, downlink signals received from the macro cell base station 10 or the small cell base station 12 are decoded, and transmitted in a signal form used in the downlink in the train cars. In the AF relay, the signal form is not changed.

In order to compensate for the propagation loss in the high frequency band and increase the reachable distance of radio waves from the stationary GM base station 6 and the GM antenna set 20, Massive MIMO is preferably used in the uplink and downlink communication between the stationary GM base station 6 and the GM antenna set 20. Massive MIMO is a technology of transmitting radio waves with a large number of transmitting antenna elements, and the directivity and the shape of the beam of radio waves can be controlled by performing precoding. The reachable distance of radio waves can be increased by sharpening the beam shape. In addition, the transmission source of the beam can control the beam direction toward the receiving destination of the beam by cooperation of the stationary GM base station 6 and the GM relay station 30. Therefore, within the range of the cell 6a of one of the stationary GM base stations 6, even when the train 2 is moving, the stationary GM base stations 6 can emit beams toward the GM antenna sets 20 mounted on the respective train cars, and the GM antenna sets 20 can emit beams toward the stationary GM base stations 6. In addition, high-speed data communication can be realized by using the multi-stream transmission in MIMO and a wide bandwidth (e.g., 200 MHz or more) in the high frequency band.

The stationary GM base station 6 has, for example, 1,024 transmitting and receiving antenna elements. Although the number of the antenna elements in the stationary GM base station 6 and the number of the antenna elements in the train 2 may be different, the numbers of the antenna elements in the stationary GM base station 6 and in the train 2 are preferably the same. Accordingly, the cars of the train 2 have 1,024 transmitting and receiving antenna elements in total. For example, in a case in which the train 2 has 16 cars, it is preferable that the GM antenna set 20 that is in each train car has 64 transmitting and receiving antenna elements. Thus, the spatial diversity effect can be enhanced by distributing the transmitting and receiving antenna elements over multiple train cars. However, it is possible to reduce the cost by arranging a single GM antenna set 20 in the train 2. In this case, the GM antenna set 20 has, preferably, 1,024 transmitting and receiving antenna elements.

In the train 2, a single antenna set 24 for communication with the macro cell base station 10 and a single antenna set 26 for communication with the small cell base station 12 are arranged. However, in order to enhance the spatial diversity, it is possible to arrange multiple antenna sets 24 and multiple antenna sets 26 in the train 2.

Figure 3:
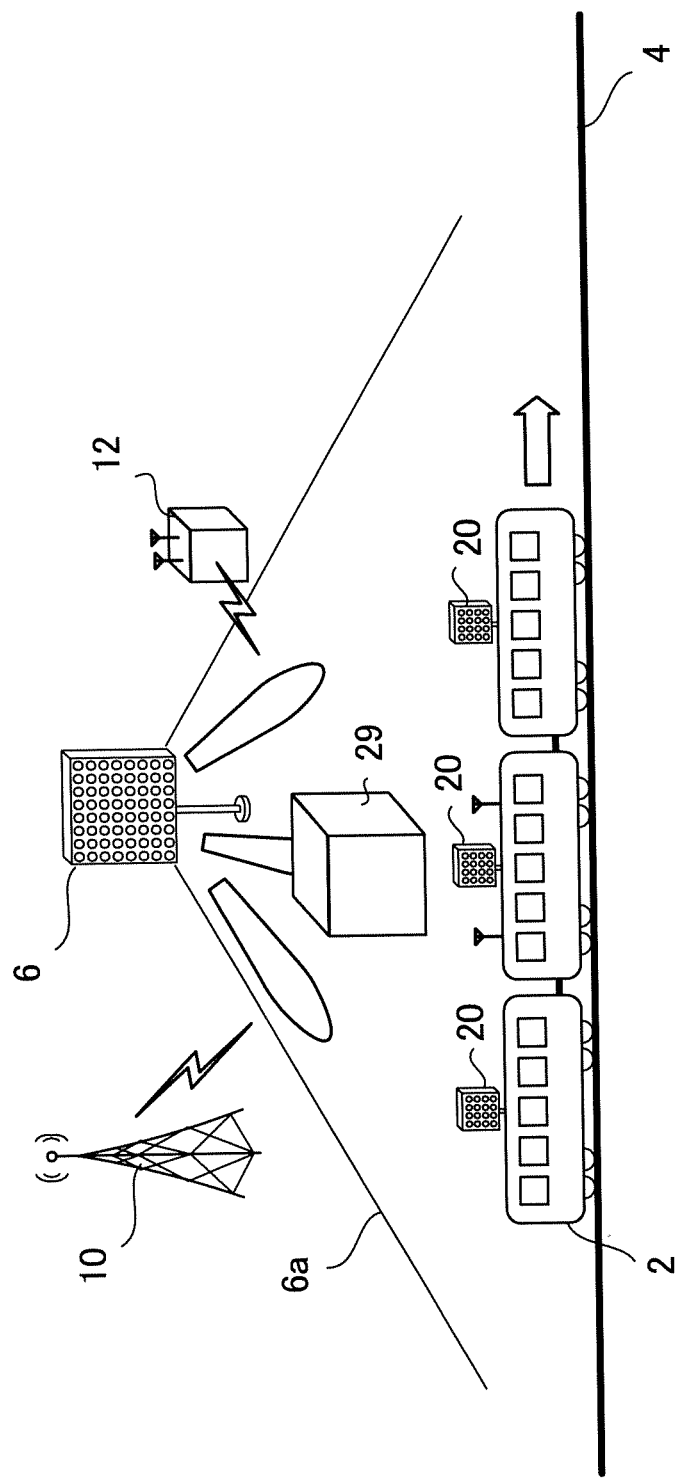
FIG. 3 is a diagram illustrating a problem in group mobility.

Problems in GM are explained below with reference to FIG. 3. As illustrated in FIG. 3, even when the train 2 exists near the stationary GM base station 6, in a case in which an obstacle 29 (e.g., a building, overhead wire, a wall, an electric pole, or other train cars) exists between the stationary GM base station 6 and the car of the train 2, propagation of radio waves between the stationary GM base station 6 and the GM antenna set 20 on the car deteriorates, and as a result, the communication quality between the user equipments 8 and the stationary GM base station 6 through the GM relay station 30 is degraded. In some cases, communication with the user equipments 8 in the train car stops. It is normally assumed that, when the train 2 enters a cell 6a, a large building is not in the cell 6a such that the stationary GM base station 6 can perform line-of-sight communication with the GM antenna set 20. However, the train 2 can pass another train.

Embodiment

Figure 4:
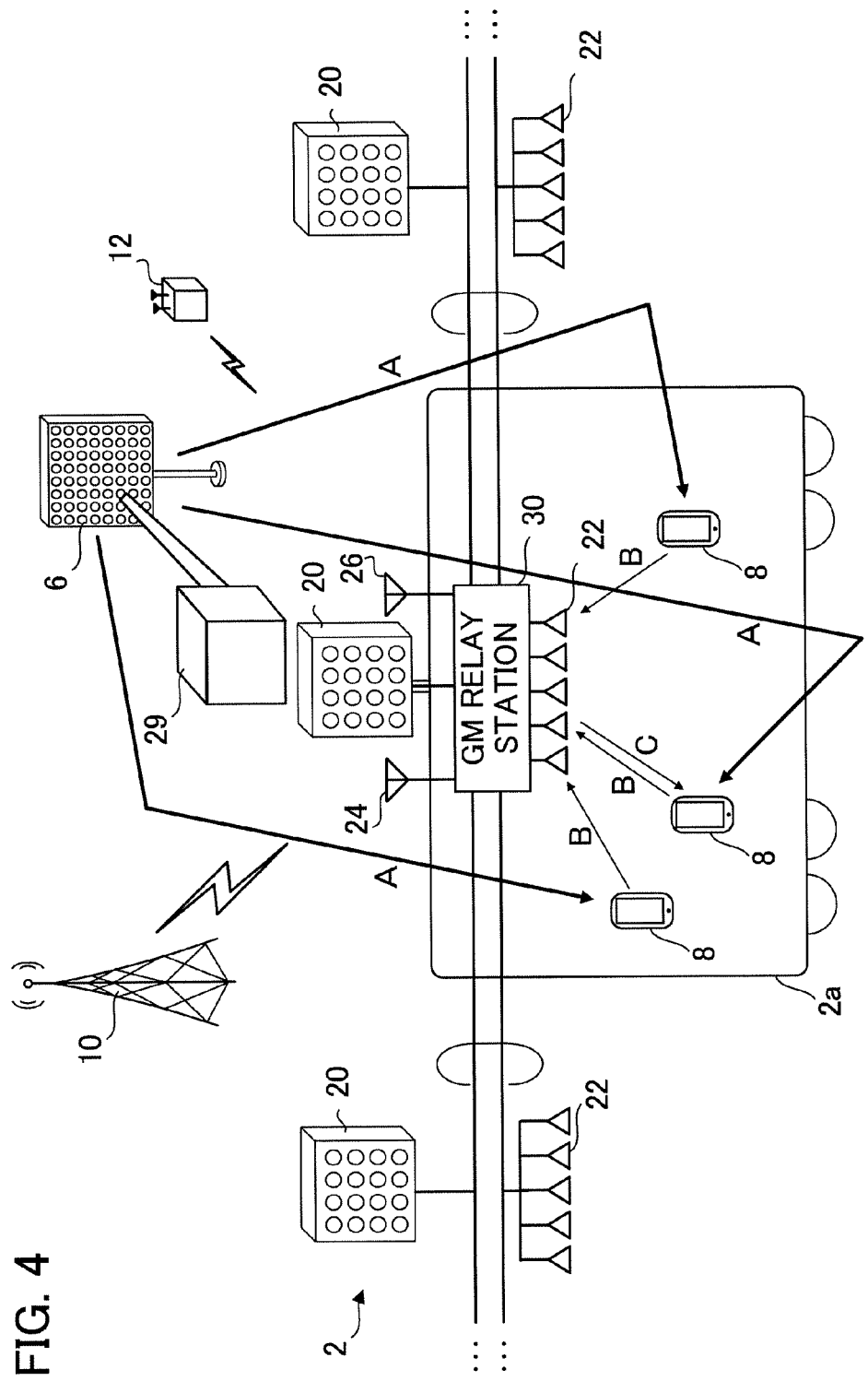
FIG. 4 is a diagram illustrating a solution to the problem according to an embodiment of the present invention.

In view of above, according to an embodiment of the present invention, the communication quality for the user equipments 8 in the conveyance is improved even when the propagation condition of radio waves between the stationary GM base station 6 and the GM relay station 30 which is arranged in the conveyance is poor. FIG. 4 illustrates the outline of a solution to the problem of GM according to the embodiment of the present invention. The basic system configuration for GM is the same as the configuration illustrated in FIGS. 1 and 2. In FIG. 4, the same reference numbers are used for indicating the already explained constituents, and these constituents other than the GM relay station 30 according to the embodiment are not explained in detail. Unlike FIG. 2, the cable 28 is not illustrated in FIG. 4. However, the cable 28 may be connected to the GM relay station 30 in the embodiment.

In the GM relay station 30 according to the embodiment, the interior antenna set 22 receives, from multiple user equipments 8 as at least some of the multiple user equipments 8 in the train 2, auxiliary radio signals indicating a downlink radio signal which the stationary GM base station 6 (or the macro cell base station 10 or the small cell base station 12) has transmitted. That is, as indicated by the arrows B, the multiple user equipments 8 in the train 2 transfer to the GM relay station 30 downlink radio signals received from any of the stationary base stations.

The GM relay station 30 makes an attempt to detect, within a total reception result of auxiliary signals, a downlink radio signal addressed to any of the user equipments 8 in the train 2, and transmits a detected downlink radio signal addressed to a user equipment 8 in the conveyance, to the user equipment 8 through the interior antenna set 22 as indicated by the arrow C. Thus, the GM relay station 30 can use the multiple user equipments 8 as substitutes for multiple downlink receiving antennas of the GM relay station 30, and receive the downlink radio signal which the stationary GM base station 6 (or the macro cell base station 10 or the small cell base station 12) has transmitted.

In a case in which the train 2 exists near the stationary GM base station 6 and at the same time in which an obstacle 29 exists between the stationary GM base station 6 and the car of the train 2, propagation of radio waves between the stationary GM base station 6 and the GM antenna set 20 on the train car deteriorates. However, scattered waves caused by the obstacle 29 reach the user equipments 8 in the train 2 as indicated by the arrows A. In a case in which the train 2 is near the stationary GM base station 6, generally, the radio waves transmitted from the stationary GM base station 6 and received by the user equipments 8 are weak when the radio waves transmitted from the stationary GM base station 6 and received by the GM antenna set 20 are strong, and the radio waves transmitted from the stationary GM base station 6 and received by the user equipments 8 are strong when the radio waves from the stationary GM base station 6 which are received by the GM antenna set 20 are weak. However, the reception qualities at the user equipments 8 of the scattered waves originating from the stationary GM base station 6 are not as good as those the user equipments 8 can decode from the downlink radio signals. Nevertheless, since the multiple user equipments 8 are generally apart from each other in the train 2, the auxiliary signals collected from the multiple user equipments 8 (indicated by the arrows B) bring about a spatial diversity effect in the GM relay station 30. The GM relay station 30 can detect downlink radio signals addressed to any of the user equipments 8 in the train 2, within the total reception result of the auxiliary signals collected from the multiple user equipments 8.

In some cases in which the obstacle 29 is large, the radio waves from the stationary GM base station 6 may reach neither the GM antenna set 20 nor the user equipments 8 in the train 2. However, even in such cases, sometimes the user equipments 8 can receive radio waves from the macro cell base station 10 or the small cell base station 12. The user equipments 8 may transmit auxiliary radio signals indicating downlink radio signals received from the macro cell base station 10 or the small cell base station 12. Even in a case in which the radio waves from the macro cell base station 10 or the small cell base station 12 are weak and the user equipments 8 cannot decode the downlink radio signals received from the macro cell base station 10 or the small cell base station 12, the GM relay station 30 can detect the downlink radio signals addressed to any of the multiple user equipments 8 in the train 2, within the total reception result of the auxiliary signals collected from the user equipments 8.

Therefore, even in a case in which the propagation condition of the radio waves between the stationary GM base station 6 and the GM relay station 30 arranged on the train car 2a is poor, and the reception quality, at the GM antenna set 20, of the downlink radio signals from the stationary GM base station 6 is unsatisfactory, the GM relay station 30 can increase the communication quality for the user equipments 8 in the train 2.

The GM relay station 30 according to the present embodiment can use the following three modes for downlink communication.

1. In a GM mode, the GM relay station 30 transmits, to a destination user equipment 8, a downlink radio signal resulting from only the downlink radio signal received from the stationary GM base station 6. The GM relay station 30 does not request the user equipments 8 to transmit auxiliary signals, and does not use a total reception result of auxiliary signals.

2. In a terminal collection mode, the GM relay station 30 requests the user equipments 8 to transmit auxiliary signals, and makes an attempt to detect a downlink radio signal addressed to a user equipment 8 in the train 2 by using only the total reception result of auxiliary signals from the user equipments 8. When a downlink radio signal addressed to the user equipment 8 in the train 2 is detected, the GM relay station 30 transmits the downlink radio signal to the user equipment 8. Even when the stationary GM relay station 30 can receive the downlink radio signal from the stationary GM base station 6, the GM relay station 30 does not use the received downlink radio signal. Preferably, the user equipments 8 transmit the auxiliary signals synchronously, and the GM relay station 30 receives a synthesized wave of the auxiliary signals. The total reception result of the auxiliary signals from the user equipments 8 is a result of analysis, by the GM relay station 30, of the synthesized wave of the auxiliary signals.

3. In a composite reception mode, the GM relay station 30 requests the user equipments 8 to transmit auxiliary signals, and makes an attempt to detect a downlink radio signal addressed to a user equipment 8 in the train 2 by using the total reception result of auxiliary signals from the user equipments 8 and a reception result of a downlink radio signal from the stationary GM base station 6. When a downlink radio signal addressed to a user equipment 8 in the train 2 is detected, the GM relay station 30 transmits the downlink radio signal to the user equipment 8. Preferably, the user equipments 8 transmit the auxiliary signals synchronously, and the GM relay station 30 receives a synthesized wave of the auxiliary signals, analyzes the downlink radio signals from the stationary GM base station 6 in a form synchronized with the synthesized wave of the auxiliary signals, and makes an attempt to detect downlink radio signals addressed to the user equipments 8 in the train 2.

In the composite reception mode, the GM relay station 30 uses the radio waves from the stationary GM base station 6 and the radio waves from the user equipments 8. Because the multiple user equipments 8 in the train 2 are apart from each other and from the GM antenna set 20, a spatial diversity effect is achieved.

When the user equipments 8 are requested to transmit auxiliary signals, the user equipments 8 do not decode the downlink radio signals received from any of the stationary base stations, and transmit the downlink radio signals as auxiliary signals in a form for uplink radio signals that is used in the train car. However, preferably, the auxiliary signals have a form which can be distinguished from the normal uplink radio signals.

Figure 5:
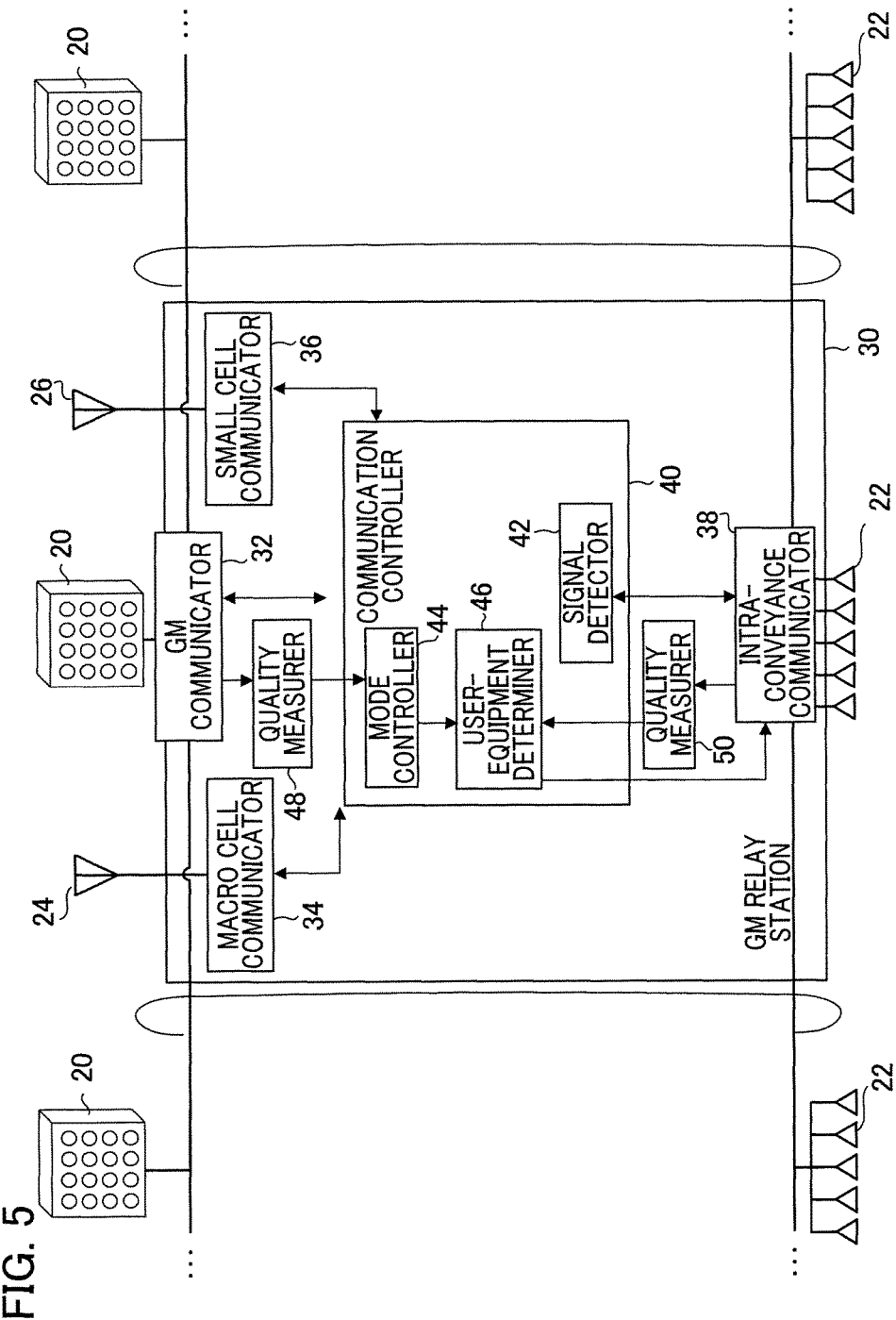
FIG. 5 is a diagram illustrating a radio relay station according to the embodiment of the present invention.

As illustrated in FIG. 5, the GM relay station 30 includes a GM communicator 32, a macro cell communicator 34, a small cell communicator 36, an intra-conveyance communicator 38, a communication controller 40, a quality measurer 48, and a quality measurer 50. The GM communicator 32 is a communication interface for performing communication with the stationary GM base station 6 by use of the GM antenna set 20. The macro cell communicator 34 is a communication interface for performing communication with the macro cell base station 10 by use of the antenna set 24. The small cell communicator 36 is a communication interface for performing communication with the small cell base station 12 by use of the antenna set 26. The intra-conveyance communicator 38 is a communication interface for performing communication with the user equipments 8 in train 2 by use of the interior antenna set 22.

Each of the GM communicator 32, the macro cell communicator 34, and the small cell communicator 36 functions as a first radio receiver that receives downlink radio signals from the corresponding base station. The intra-conveyance communicator 38 functions as a second radio receiver that receives uplink radio signals from the multiple user equipments 8 in the train 2.

In addition, the intra-conveyance communicator 38 functions as a first radio transmitter that that transmits downlink radio signals resulting from downlink radio signals transmitted from the stationary base station and received by the first radio receiver, to destination user equipments 8 in the train 2. Each of the GM communicator 32, the macro cell communicator 34, and the small cell communicator 36 functions as a second radio transmitter that transmits to the stationary base station uplink radio signals resulting from the uplink radio signals transmitted from the user equipments 8 and received by the second radio receiver.

In addition, the intra-conveyance communicator 38 receives auxiliary radio signals indicating downlink radio signals transmitted by the stationary base station (the stationary GM base station 6, the macro cell base station 10, or the small cell base station 12), from more than one user equipment 8 being at least some of the multiple user equipments 8 in the train 2, where the more than one user equipment 8 transmits the auxiliary signals in response to a request by the GM relay station 30.

The quality measurer (a first quality measurer) 48 measures the quality of radio waves transmitted from the stationary GM base station 6 and received by the GM communicator 32. The "quality" may be represented by a reference signal received power (RSRP), a reference signal received quality (RSRQ), or other quality indexes.

The communication controller 40 is a CPU (Central Processing Unit), and includes a signal detector 42, a mode controller 44, and a user-equipment determiner 46. The signal detector 42, the mode controller 44, and the user-equipment determiner 46 are function blocks that are realized by the communication controller 40 executing a computer program stored in a storage (not shown) and functioning in accordance with the computer program.

The signal detector 42 makes an attempt to detect a downlink radio signal addressed to a user equipment 8 in the train 2, by using a total reception result of auxiliary signals received from the user equipments 8. In the composite reception mode, the signal detector 42 makes an attempt to detect a downlink radio signal addressed to a user equipment 8 in the train 2, by using the total reception result of auxiliary signals from the user equipments 8 and the reception result of downlink radio signals from the stationary GM base station 6. The intra-conveyance communicator 38 transmits to the user equipment 8 the downlink radio signal being addressed to the user equipment 8 in the conveyance and detected by the signal detector 42.

For example, the successive interference cancellation (SIC), the maximum limit likelihood detection (MILD), or the like can be used for detection of a downlink radio signal addressed to a user equipment 8 in the train 2, the detection using the total reception result of auxiliary signals.

The mode controller 44 determines in which of the GM mode, the terminal collection mode, and the composite reception mode the GM relay station 30 is to operate, on the basis of the quality of the radio waves from the stationary GM base station 6, which quality is measured by the quality measurer 48. When the mode controller 44 determines the terminal collection mode or the composite reception mode, the user-equipment determiner 46 determines more than one user equipment 8 that is to transmit auxiliary signals, from among the multiple user equipments 8 in the train 2, and transmits a transmission request signal for requesting each of the determined user equipments 8 to transmit an auxiliary signal, by using the intra-conveyance communicator 38.

The quality measurer (a second quality measurer) 50 measures the quality of the radio waves of the auxiliary signals from the user equipments 8 that are received by the intra-conveyance communicator 38. The "quality" may be represented by a reference signal received power, a reference signal received quality, a bit error rate, a block error rate, or other quality indexes. When the quality of the radio waves of the auxiliary signals is lower than a threshold, the user-equipment determiner 46 determines more than one user equipments 8 other than the more than one user equipment 8 determined earlier, or one or more other user equipments 8 in addition to the more than user equipments 8 determined earlier, to be the user equipments 8, which are to transmit auxiliary signals. Then, the user-equipment determiner 46 transmits a transmission request signal for requesting the determined user equipment(s) 8 to transmit an auxiliary signal, by using the intra-conveyance communicator 38.

A procedure in which the user-equipment determiner 46 determines a user equipment 8 that is to transmit an auxiliary signal is explained below. The communication controller 40 in the GM relay station 30 recognizes channel state information (CSI) transmitted from the user equipments 8 in the train 2, and identifiers of the user equipments 8. The communication controller 40 recognizes user equipments 8 existing in the train 2, being in the condition to be able to communicate with the GM relay station 30, and having a function of transmitting an auxiliary signal, i.e., user equipments 8 from which the GM relay station 30 is to collect auxiliary signals. The conditions required of the user equipment 8 from which the GM relay station 30 is to collect auxiliary signals are as follows.

1) The user equipment 8 is in the train 2.

2) The user equipment 8 is powered on and in the communication mode.

3) The quality of reception at the GM relay station 30 from the user equipment 8 is sufficiently high.

4) In a case in which only one or more specific user equipments 8 have a function of communicating with the GM relay station 30, the user equipment 8 has the function of communicating with the GM relay station 30.

5) In a case in which only one or more specific user equipments 8 have a function of transmitting an auxiliary signal, the user equipment 8 has the function of transmitting an auxiliary signal.

The user-equipment determiner 46 may determine all of the user equipments 8 satisfying the above conditions to be the user equipments 8, which are to transmit auxiliary signals. Since transmission of auxiliary signals increases the processing burden on the user equipments 8 and electric power consumption, the user-equipment determiner 46 may select a part of the user equipments 8 satisfying the above conditions as the user equipments 8, which are to transmit auxiliary signals. The user-equipment determiner 46 may limit the number of the user equipments 8, which are to transmit auxiliary signals, by a maximum limit and a minimum limit.

In a case in which the user-equipment determiner 46 selects a part of the user equipments 8, for example, the following standards for the selection can be considered.

1) The user-equipment determiner 46 may randomly select user equipments 8 that are to transmit auxiliary signals.

Figure 6:
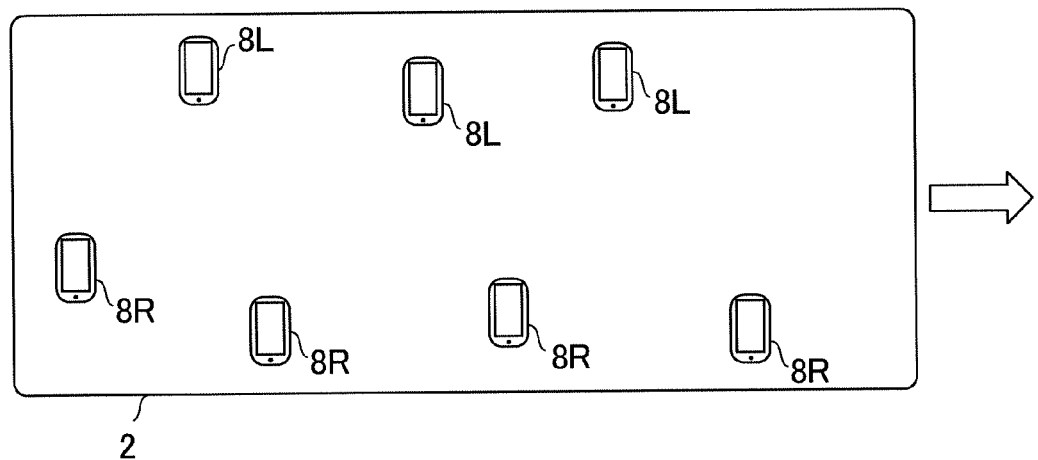
FIG. 6 is a diagram illustrating an arrangement of the user equipments in a train car.

2) The user-equipment determiner 46 may select the user equipments 8, which are to transmit auxiliary signals, according to the positions of the user equipments 8 in each train car. For example, the user-equipment determiner 46 may select user equipments 8R located on the right side in the train traveling direction in the train car illustrated in FIG. 6, or user equipments 8L located on the left side. On which of the right and left sides the user equipments 8 are selected is determined on the basis of, for example, the strengths of the uplink radio signals or CQIs from the user equipments 8. In a case in which the interior antenna set 22 in the train car is located on the right side of the train car, the uplink radio signals from the user equipments 8R located on the right side are stronger than the uplink radio signals from the user equipments 8L located on the left side, and the CQIs reported by the user equipments 8R located on the right side are better than the CQIs reported by the user equipments 8L located on the left side. In addition, when the user equipments 8 inform the GM relay station 30 of the strengths of downlink radio signals from the macro cell base station 10 or the small cell base station 12 which is located near the train 2, the user-equipment determiner 46 can also determine the positions of the user equipments 8 in the train cars. When the macro cell base station 10 or the small cell base station 12 is located on the right side of the train 2, the downlink radio signals which the user equipments 8R located on the right side receive from the macro cell base station 10 or the small cell base station 12 are stronger than the downlink radio signals which the user equipments 8L located on the left side receive from the macro cell base station 10 or the small cell base station 12.

3) The user-equipment determiner 46 may select a user equipment 8 that has a good CQI (higher than a certain threshold).

4) The user-equipment determiner 46 may select a user equipment 8 that receives strong downlink radio signals (higher than a certain threshold) from the macro cell base station 10 or the small cell base station 12. It is possible to combine the above conditions.

As described above, in a case in which the quality of the radio waves of the auxiliary signals measured by the quality measurer 50 is lower than a threshold, the user-equipment determiner 46 determines more than one user equipment 8 other than the more than one user equipment 8 determined earlier, or one or more other user equipments 8 in addition to the more than one user equipment 8 determined earlier, to be the user equipments 8 to transmit auxiliary signals.

Figure 7:
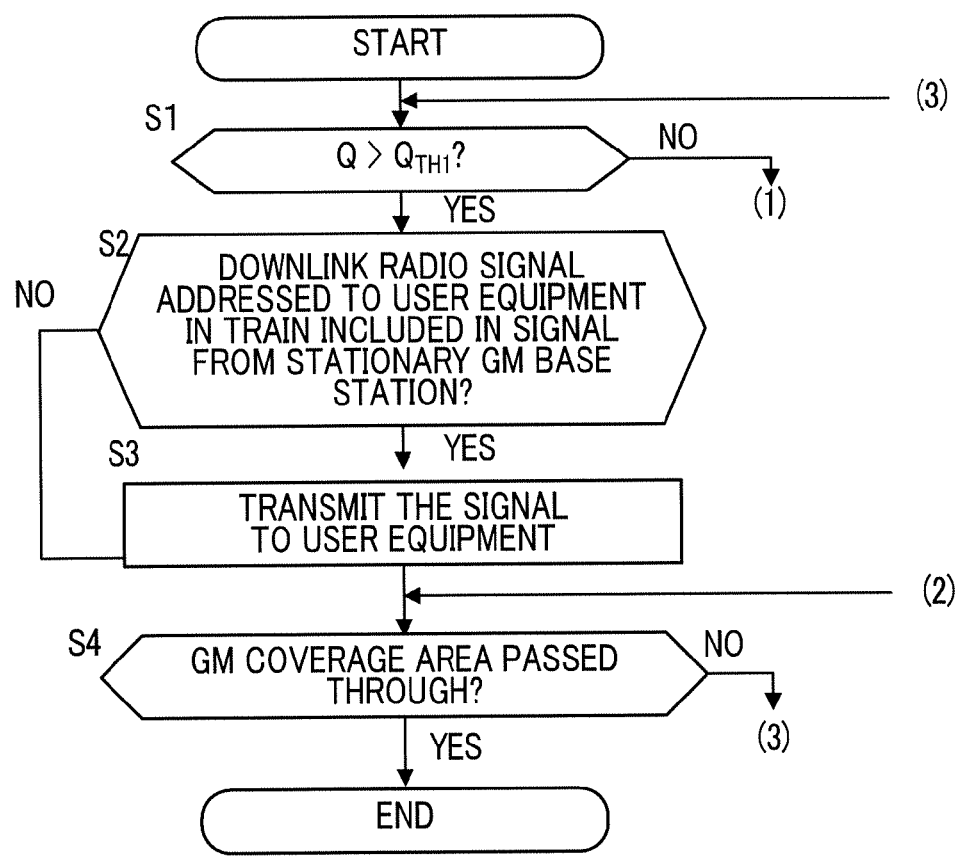
FIG. 7 is a part of a flowchart indicating an example of processing by the radio relay station according to the embodiment of the present invention.

An example of processing performed by the GM relay station 30 is explained below with reference to the flowchart indicated in FIGS. 7 and 8. This processing starts when the GM relay station 30 enters the GM coverage area. The GM coverage area is constituted by the cell(s) 6a of at least one stationary GM base station 6. In a case in which multiple cells 6a are continuously arranged without a gap, the GM coverage area is Ruined by these multiple cells 6a. Whether or not the GM relay station 30 enters the GM coverage area can be determined on the basis of, for example, the train timetable, the strength of signals from the stationary GM base station 6, a special signal from the stationary GM base station 6 indicating the coverage area, and the like, or the like.

In step S1, the mode controller 44 determines whether or not the quality Q of radio waves from the stationary GM base station 6, which is measured by the quality measurer 48, is higher than a first threshold $Q_{TH1}$. When the determination in step S1 is affirmative, the mode controller 44 controls the signal detector 42 and the intra-conveyance communicator 38 to enter the GM mode. The GM mode is realized by steps S2 and S3. In step S2, the signal detector 42 determines whether or not the downlink radio signals transmitted from the stationary GM base station 6 and received by the GM communicator 32 include a downlink radio signal addressed to a user equipment 8 in the train 2. When the determination in step S2 is affirmative, the intra-conveyance communicator 38 transmits a downlink radio signal resulting from the downlink radio signal transmitted from the stationary GM base station 6 and received by the GM communicator 32, to the user equipment 8 as the destination (step S3).

In the GM mode, the GM relay station 30 does not request the user equipments 8 to transmit auxiliary signals, and does not receive the auxiliary signals. Therefore, the GM relay station 30 does not make an attempt to detect, within the total reception result of auxiliary signals, a downlink radio signal addressed to a user equipment 8 in the train 2.

In step S4, the communication controller 40 determines whether or not the GM relay station 30 has passed through the GM coverage area. Whether or not the GM relay station 30 has passed through the GM coverage area can be determined on the basis of, for example, the train timetable, the strength of signal from the stationary GM base station 6, a special signal from the stationary GM base station 6 indicating the coverage area, and the like, or the like. When the determination in step S4 is affirmative, the processing is completed. When the determination is negative in step S4, the operation returns to step S1.

The GM relay station 30 has a function of changing the connection from the current stationary GM base station 6 to another stationary GM base station 6. Although not shown in FIGS. 7 and 8, the communication controller 40 executes steps necessary for the change as above. In a case in which the GM coverage area is constituted by multiple cells 6a, the GM relay station 30 changes the connection from the current stationary GM base station 6 to another stationary GM base station 6.

When the determination in step S1 is negative, the operation proceeds to step S6. In step S6, the mode controller 44 determines whether or not the quality Q of the radio waves from the stationary GM base station 6, which is measured by the quality measurer 48, is higher than a second threshold $Q_{TH2}$. The second threshold $Q_{TH2}$ is lower than the first threshold $Q_{TH1}$. When the determination in step S6 is negative, the mode controller 44 controls the signal detector 42 and the intra-conveyance communicator 38 to enter the terminal collection mode. The terminal collection mode is realized by steps S7 to S15.

In step S7, the communication controller 40 determines whether or not the number m of determinations of user equipment(s) 8 from which the auxiliary signal is to be collected is greater than a threshold $m_{TH}$. When the determination in step S7 is negative, the operation proceeds to step S8, and the value m is incremented by one. The initial value of m is zero.

In step S9, the user-equipment determiner 46 determines a criterion for selection of user equipments 8 from which auxiliary signals are to be collected, according to the number m of determinations. For example, the user-equipment determiner 46 may select the user equipments 8 located on the right side of the train car when the number m of determinations is one, the user equipments 8 located on the left side of the train car when the number m of determinations is two, and all the user equipments 8 when the number m of determinations is three. Alternatively, the user-equipment determiner 46 may select user equipments 8 that receive downlink radio signals higher than a threshold $S_{TH1}$ from the macro cell base station 10 or the small cell base station 12 when the number m of determinations is one, user equipments 8 that receive downlink radio signals higher than a threshold $S_{TH2}$ ($S_{TH2}<S_{TH1}$) from the macro cell base station 10 or the small cell base station 12 when the number m of determinations is two, and user equipments 8 that receive downlink radio signals higher than a threshold $S_{TH3}$ ($S_{TH3}<S_{TH2}$) from the macro cell base station 10 or the small cell base station 12 when the number m of determinations is three. Thereafter, the number of the user equipments 8 may be gradually increased.

In step S10, the user-equipment determiner 46 determines whether or not a user equipment 8 satisfying the selection criterion exists. Specifically, the user-equipment determiner 46 determines whether or not the number of the user equipments 8 satisfying the selection criterion is equal to or greater than the minimum limit (e.g., two). When the determination in step S10 is negative, the operation returns to step S7. When the determination in step S10 is affirmative, the operation proceeds to step S11, and the user-equipment determiner 46 transmits a transmission request signal for requesting the determined user equipments 8 to transmit auxiliary signals, by using the intra-conveyance communicator 38. When the number of the user equipments 8 satisfying the selection criterion is greater than the maximum limit, the user-equipment determiner 46 may transmit the transmission request signal to as many user equipments 8 as the maximum limit.

In step S12, the communication controller 40 receives auxiliary signals from the user equipments 8 that are the destinations of the transmission request signal. In step S13, the communication controller 40 determines whether or not the quality of the radio waves of the auxiliary signals measured by the quality measurer 50 is higher than a third threshold $Q_{TH3}$. When the determination in step S13 is negative, the operation returns to step S7.

When the determination in step S13 is affirmative, the signal detector 42 makes an attempt to detect a downlink radio signal addressed to a user equipment 8 in the train 2 by using only the total reception result of the auxiliary signals from the user equipments 8. In step S14, the signal detector 42 determines whether or not a downlink radio signal addressed to a user equipment 8 in the train 2 is found within the total reception result of the auxiliary signals. When the determination in step S14 is affirmative, the intra-conveyance communicator 38 transmits a downlink radio signal resulting from the total reception result of the auxiliary signals, to the user equipment 8, which is the destination (step S15).

In the terminal collection mode, even if the GM antenna set 20 can receive a downlink radio signal from the stationary GM base station 6, the signal detector 42 does not use the received downlink radio signal. The terminal collection mode operates in a case in which the quality Q of the radio waves from the stationary GM base station 6 is lower than the second threshold $Q_{TH2}$, which is lower than the first threshold $Q_{TH1}$, i.e., in a case in which the quality Q of the radio waves from the stationary GM base station 6 is extremely poor. In such a case, the radio waves from the stationary GM base station 6 may reach neither the GM antenna set 20 nor the user equipments 8 in the train 2. Accordingly, it may be considered that in many cases, the auxiliary signals transmitted by the user equipments 8 in the terminal collection mode indicate downlink radio signal which the user equipments 8 have received from the macro cell base station 10 or the small cell base station 12. Thus, it is preferable in step S9 that the criterion of selection of the user equipments 8 from which the auxiliary signals are to be collected be based on the strengths of the downlink radio signals received by the user equipments 8 from the macro cell base station 10 or the small cell base station 12.

When the determination in step S6 is affirmative, the mode controller 44 controls the signal detector 42 and the intra-conveyance communicator 38 to enter the composite reception mode. The composite reception mode is realized by steps S17 to S25.

In step S17, the communication controller 40 determines whether or not the number m of determinations of the user equipments 8 from which auxiliary signals are to be collected is greater than the threshold $m_{TH}$. When the determination in step S17 is negative, the operation proceeds to step S18, and the value m is incremented by one. The initial value of m is zero.

In step S19, the user-equipment determiner 46 determines a criterion for selection of the user equipment 8 from which auxiliary signals are to be collected, according to the number m of determinations. For example, the user-equipment determiner 46 may select the user equipments 8 located on the right side of the train car when the number m of determinations is one, the user equipments 8 located on the left side of the train car when the number m of determinations is two, and all the user equipments 8 when the number m of determinations is three. Alternatively, the user-equipment determiner 46 may select a user equipment 8 that receives a downlink radio signal higher than a threshold $S_{TH1}$ from the macro cell base station 10 or the small cell base station 12 when the number m of determinations is one, a user equipment 8 that receives a downlink radio signal higher than a threshold $S_{TH2}$ ($S_{TH2}<S_{TH1}$) from the macro cell base station 10 or the small cell base station 12 when the number m of determinations is two, and a user equipment 8 that receives a downlink radio signal higher than a threshold $S_{TH3}$ ($S_{TH3}<S_{TH2}$) from the macro cell base station 10 or the small cell base station 12 when the number m of determinations is three. Further, the number of the user equipments 8 may be gradually increased.

In step S20, the user-equipment determiner 46 determines whether or not a user equipment 8 satisfying the selection criterion is found. Specifically, the user-equipment determiner 46 determines whether or not the number of the user equipments 8 satisfying the selection criterion is equal to or greater than the minimum limit (e.g., two). When the determination in step S20 is negative, the operation returns to step S17. When the determination in step S20 is affirmative, the operation proceeds to step S21, and the user-equipment determiner 46 transmits a transmission request signal for requesting the determined user equipments 8 to transmit auxiliary signals, by using the intra-conveyance communicator 38. When the number of the user equipments 8 satisfying the selection criterion is greater than the maximum limit, the user-equipment determiner 46 may transmit the transmission request signal to as many user equipments 8 as the maximum limit.

In step S22, the communication controller 40 receives auxiliary signals from the user equipments 8 to which the transmission request signal has been addressed. In step S23, the communication controller 40 determines whether or not the quality of the radio waves of the auxiliary signals measured by the quality measurer 50 is higher than the third threshold $Q_{TH3}$. When the determination in step S23 is negative, the operation returns to step S17.

When the determination in step S23 is affirmative, the signal detector 42 makes an attempt to detect a downlink radio signal addressed to a user equipment 8 in the train 2 by using a reception result of the downlink radio signal from the stationary GM base station 6 and the total reception result of the auxiliary signals from the user equipments 8. In step S24, the signal detector 42 determines whether or not a downlink radio signal addressed to a user equipment 8 in the train 2 is found within the reception result of downlink radio signals from the stationary GM base station 6 and the total reception result of the auxiliary signals. When the determination in step S24 is affirmative, the intra-conveyance communicator 38 transmits a downlink radio signal resulting from the reception result of downlink radio signals from the stationary GM base station 6 and the total reception result of the auxiliary signals, to the user equipment 8, which is the destination (step S25).

It may be considered that in many cases, the auxiliary signals transmitted by the user equipments 8 in the composite reception mode indicate the downlink radio signals received by the user equipments 8 from the macro cell base station 10 or the small cell base station 12, or the downlink radio signals received by the user equipments 8 from the macro cell base station 10.

As explained above, according to the present embodiment, in a case in which the quality Q of the radio waves from the stationary GM base station 6 is higher than the first threshold $Q_{TH1}$ (i.e., when the quality Q of the radio waves from the stationary GM base station 6 is good), the GM mode is used, the GM relay station 30 does not use the auxiliary signals from the user equipments 8, and the intra-conveyance communicator 38 transmits downlink radio signals resulting from the downlink radio signals transmitted from the stationary GM base station 6, to the user equipments 8 as the destinations. On the other hand, in a case in which the quality Q of the radio waves from the stationary GM base station 6 is lower than the first threshold $Q_{TH1}$, the GM relay station 30 makes an attempt to detect a downlink radio signal within the reception result of the auxiliary signals from the user equipments 8. When a downlink radio signal addressed to a user equipment 8 in the train 2 is detected by the signal detector 42, the intra-conveyance communicator 38 transmits the downlink radio signal to the user equipment 8. Therefore, even in a case in which the propagation condition of the radio waves between the stationary GM base station 6 and the GM relay station 30 arranged on the train car 2a is poor, and the reception quality, at the GM antenna set 20, of the downlink radio signals from the stationary GM base station 6 is unsatisfactory, the GM relay station 30 can increase the communication quality for the user equipments 8 in the train 2.

In addition, according to the present embodiment, in a case in which the quality Q of the radio waves from the stationary GM base station 6 is lower than the first threshold $Q_{TH1}$ and higher than the second threshold $Q_{TH2}$ (which is lower than the first threshold $Q_{TH1}$), the composite reception mode is used, the GM relay station 30 requests the user equipments 8 to transmit auxiliary signals, and makes an attempt to detect a downlink radio signal addressed to a user equipment 8 in the train 2, by using the total reception result of the auxiliary signals from the user equipments 8 and the reception result of the downlink radio signal from the stationary GM base station 6. When a downlink radio signal addressed to a user equipment 8 in the train 2 is detected, the GM relay station 30 transmits the downlink radio signal to the user equipment 8. According to the composite reception mode, the accuracy of the detection of downlink radio signals addressed to the user equipments 8 is improved. In a case in which the quality Q of the radio waves from the stationary GM base station 6 is lower than the second threshold $Q_{TH2}$ (i.e., when the quality Q of the radio waves from the stationary GM base station 6 is very low), the terminal collection mode is used, the GM relay station 30 requests the user equipments 8 to transmit auxiliary signals, and makes an attempt to detect a downlink radio signal addressed to a user equipment 8 in the train 2, by using only the total reception result of the auxiliary signals from the user equipments 8. When a downlink radio signal addressed to a user equipment 8 in the train 2 is detected, the GM relay station 30 transmits the downlink radio signal to the user equipment 8. According to the terminal collection mode, the accuracy of the detection of downlink radio signals addressed to the user equipments 8 is improved.

Further, according to the present embodiment, the GM relay station 30 is provided with the user-equipment determiner 46, which determines more than one user equipment 8, each of which is to transmit an auxiliary signal, among the multiple user equipments 8 in the train 2. The GM relay station 30 transmits a transmission request signal for requesting the more than one user equipment 8 determined by the user-equipment determiner 46 to transmit auxiliary signals. Therefore, it is unnecessary that all the users 8 in the train 2 transmit the auxiliary signals, and the users 8 are limited, which should transmit auxiliary signals that increase the processing burden and power consumption in the user equipments 8.

When the quality of the radio waves of the auxiliary signals is lower than the third threshold value $Q_{TH3}$ in the composite reception mode or the terminal collection mode, the user-equipment determiner 46 changes the selection criterion for collecting auxiliary signals, and determines more than one user equipment 8 other than the more than one user equipment 8 determined earlier, or one or more other user equipments 8 in addition to the more than one user equipment 8 determined earlier, to be the user equipments 8 to transmit auxiliary signals. Therefore, the accuracy of the detection of downlink radio signals addressed to the user equipments 8 is improved. After the change of the selection criterion, the transmission request signal for requesting transmission of an auxiliary signal may be transmitted to all the user equipments 8 in the train 2.

Modifications

In a case in which at least one of the user equipments 8 that receives a downlink radio signal detects an error in the signal in the above embodiment, the user equipment 8 transmits a retransmission request to the GM relay station 30. When the GM relay station 30 receives the retransmission request from the at least one user equipment 8, for HARQ (hybrid automatic repeat request), the mode controller 44 in the GM relay station 30 first activates the GM mode, and checks whether or not a downlink radio signal addressed to the user equipment 8, which has transmitted the retransmission request resulting from a downlink radio signal received earlier from the stationary GM base station 6, is stored in the GM relay station 30. When the above downlink radio signal is stored, the GM relay station 30 transmits the downlink radio signal to the above user equipment 8 by using the intra-conveyance communicator 38.

In a case in which no downlink radio signal addressed to the above user equipment 8 is stored in the GM relay station 30 due to poor propagation conditions between the stationary GM base station 6 and the GM relay station 30, the mode controller 44 activates the terminal collection mode or the composite reception mode, and requests the user equipments 8 to transmit auxiliary signals indicating earlier downlink radio signals. The mode controller 44 makes an attempt to detect an earlier downlink radio signal addressed to the user equipment 8 which has transmitted the retransmission request, by using the total reception result of the auxiliary signals from the user equipments 8 (or the total reception result of auxiliary signals from the user equipments 8 and the reception result of downlink radio signals from the stationary GM base station 6). When the earlier downlink radio signal addressed to the above user equipment 8 is detected, the mode controller 44 transmits the above downlink radio signal to the above user equipment 8. When no downlink radio signal addressed to the above user equipment 8 is detected even in the above operations, the communication controller 40 requests retransmission from the stationary GM base station 6.

The above modification may be executed independently of the described embodiment, in which the mode is determined according to the quality Q of the radio waves from the stationary GM base station 6.

Although the conveyance is a railroad train in the described embodiment, the present invention can be applied to single-car trains, buses, ships, airplanes, or other conveyances.

The respective functions which the CPU in the GM relay station 30 performs may instead be performed by hardware or programmable logic devices such as FPGA (Field Programmable Gate Array), DSP (Digital Signal Processor), or the like.

DESCRIPTION OF REFERENCE SIGNS

2 train (conveyance)
4 track
6 stationary GM base station (stationary base station)
8 user equipment
10 macro cell base station (stationary base station)
12 small cell base station (stationary base station)
20 GM antenna set
22 interior antenna set
24 antenna set
26 antenna set
28 cable
29 obstacle
30 GM relay station
32 GM communicator (first radio receiver)
34 macro cell communicator (first radio receiver)
36 small cell communicator (first radio receiver, or second radio transmitter)
38 intra-conveyance communicator (second radio receiver, or first radio transmitter)
40 communication controller
42 signal detector
44 mode controller
46 user-equipment determiner
48 quality measurer (first quality measurer)
50 quality measurer (second quality measurer).

The invention claimed is:

1. A radio relay station arranged on a moving conveyance, comprising:
   a first radio receiver configured to receive a downlink radio signal from at least one stationary base station that is fixed outside the conveyance;
   a second radio receiver configured to receive uplink radio signals from a plurality of user equipments in the conveyance, and to receive, from more than one user equipment being at least a part of the plurality of user equipments, auxiliary signals indicating the downlink radio signal which the at least one stationary base station has transmitted;
   a first radio transmitter configured to transmit, to a destination user equipment in the conveyance, a downlink radio signal resulting from the downlink radio signal transmitted from the at least one stationary base station and received by the first radio receiver;
   a second radio transmitter configured to transmit to the at least one stationary base station uplink radio signals resulting from the uplink radio signals transmitted from the plurality of user equipments and received by the second radio receiver; and
   a signal detector configured to detect within a result of reception of the auxiliary signals a downlink radio signal that is addressed to a user equipment in the conveyance,
   wherein the first radio transmitter transmits the downlink radio signal, which is detected by the signal detector and is addressed to the user equipment in the conveyance, to that user equipment.

2. The radio relay station according to claim 1, further comprising:
   a first quality measurer configured to measure quality of a radio wave transmitted from the at least one stationary base station and received by the first radio receiver, and
   a mode controller configured to control the signal detector and the first radio transmitter,
   wherein the mode controller controls the signal detector and the first radio transmitter such that:
   in a case in which the quality of the radio wave from the at least one stationary base station is higher than a first threshold, the signal detector does not perform downlink radio signal detection within the result of reception of the auxiliary signals, and the first radio transmitter transmits to the destination user equipment the downlink radio signal resulting from the downlink radio signal transmitted from the at least one stationary base station and received by the first radio receiver,
   whereas, in a case in which the quality of the radio wave from the stationary base station is lower than the first threshold, the signal detector makes an attempt to detect the downlink radio signal within the result of reception of the auxiliary signals, and if a downlink radio signal that is addressed to a user equipment in the conveyance is detected by the signal detector, the first radio transmitter transmits that downlink radio signal to that user equipment.

3. The radio relay station according to claim 2, further comprising a user-equipment determiner configured to determine more than one user equipment that is to transmit the auxiliary signals, among the plurality of user equipments,
   wherein the radio relay station transmits a transmission request signal for requesting the more than one user equipment determined by the user-equipment determiner to transmit auxiliary signals.

4. The radio relay station according to claim 3, further comprising a second quality measurer configured to measure quality of radio waves of the auxiliary signals,
   wherein when the quality of the radio waves of the auxiliary signals is lower than a third threshold, the user-equipment determiner determines more than one user equipment other than the more than one user equipment determined earlier, or one or more other user equipments in addition to the more than one user equipment determined earlier, to be the more than one user equipment, which is to transmit the auxiliary signals.

5. The radio relay station according to claim 2,
   wherein the mode controller controls the signal detector and the first radio transmitter such that:
   in a case in which the quality of the radio wave from the stationary base station is lower than the first threshold and higher than a second threshold that is lower than the first threshold, the signal detector makes an attempt to detect the downlink radio signal addressed to the user equipment in the conveyance within a result of reception of the auxiliary signals and a result of reception, by the first radio receiver, of the downlink radio signal from at least one the stationary base station, and if the downlink radio signal addressed to the user equipment in the conveyance is detected by the signal detector, the first radio transmitter transmits that downlink radio signal to that user equipment,
   whereas, in a case in which the quality of the radio wave from the stationary base station is lower than the second threshold, the signal detector makes an attempt to detect the downlink radio signal addressed to the user equipment in the conveyance within the result of reception of the auxiliary signals, without using the result of reception, by the first radio receiver, of the downlink radio signal from the at least one stationary base station, and if the downlink radio signal addressed to the user equipment in the conveyance is detected by the signal detector, the first radio transmitter transmits that downlink radio signal to that user equipment.

6. The radio relay station according to claim 5, further comprising a user-equipment determiner configured to determine more than one user equipment that is to transmit the auxiliary signals, among the plurality of user equipments,
   wherein the radio relay station transmits a transmission request signal for requesting the more than one user equipment determined by the user-equipment determiner to transmit auxiliary signals.

7. The radio relay station according to claim 6, further comprising a second quality measurer configured to measure quality of radio waves of the auxiliary signals,
   wherein when the quality of the radio waves of the auxiliary signals is lower than a third threshold, the user-equipment determiner determines more than one user equipment other than the more than one user equipment determined earlier, or one or more other user equipments in addition to the more than one user equipment determined earlier, to be the more than one user equipment, which is to transmit the auxiliary signals.

8. The radio relay station according to claim 1, further comprising a user-equipment determiner configured to determine more than one user equipment that is to transmit the auxiliary signals, among the plurality of user equipments,
   wherein the radio relay station transmits a transmission request signal for requesting the more than one user equipment determined by the user-equipment determiner to transmit auxiliary signals.

9. The radio relay station according to claim 8, further comprising a second quality measurer configured to measure quality of radio waves of the auxiliary signals,
   wherein when the quality of the radio waves of the auxiliary signals is lower than a third threshold, the user-equipment determiner determines more than one user equipment other than the more than one user equipment determined earlier, or one or more other user equipments in addition to the more than one user equipment determined earlier, to be the more than one user equipment, which is to transmit the auxiliary signals.

10. The radio relay station according to claim 1,
    wherein when the radio relay station receives a retransmission request from at least one user equipment in the conveyance, it is first checked, without the signal detector detecting the downlink radio signal within the result of reception of the auxiliary signals, whether or not an earlier downlink radio signal from which the retransmission request resulted and which is addressed to the user equipment having transmitted the retransmission request is stored in the radio relay station, with the downlink radio signal being transmitted from the at least one stationary base station and received by the first radio receiver, and if the downlink radio signal is stored in the radio relay station, that downlink radio signal is transmitted, by the first radio transmitter, to the user equipment having transmitted the retransmission request,
    whereas, if the downlink radio signal is not stored in the radio relay station, the signal detector attempts to detect the downlink radio signal, within the result of reception of auxiliary signals indicating earlier downlink radio signals, or within a result of reception of the auxiliary signals indicating the earlier downlink radio signals and a result of reception of an earlier downlink radio signal from the at least one stationary base station, and if the downlink radio signal which is addressed to the user equipment having transmitted the retransmission request is detected, that downlink radio signal is transmitted, by using the first radio transmitter, to the user equipment having transmitted the retransmission request.

* * * * *